(12) United States Patent
Simon

(10) Patent No.: US 8,359,224 B2
(45) Date of Patent: Jan. 22, 2013

(54) SYSTEMS AND/OR METHODS FOR IDENTIFYING SERVICE CANDIDATES BASED ON SERVICE IDENTIFICATION INDICATORS AND ASSOCIATED ALGORITHMS

(75) Inventor: Katrina Simon, St. Ingbert (DE)

(73) Assignee: Software AG, Darmstadt (DE)

( * ) Notice: Subject to any disclaimer, the term of this patent is extended or adjusted under 35 U.S.C. 154(b) by 0 days.

(21) Appl. No.: 13/149,003

(22) Filed: May 31, 2011

(65) Prior Publication Data

US 2012/0310681 A1    Dec. 6, 2012

(51) Int. Cl.
*G06F 17/50* (2006.01)
(52) U.S. Cl. ...................................................... 705/7.27
(58) Field of Classification Search ................... 705/7.27
See application file for complete search history.

(56) References Cited

U.S. PATENT DOCUMENTS

| | | | |
|---|---|---|---|
| 2007/0179828 A1 | 8/2007 | Elkin et al. | |
| 2009/0171720 A1* | 7/2009 | Crook et al. | 705/7 |
| 2009/0210499 A1 | 8/2009 | Upadhyayula et al. | |
| 2010/0071028 A1 | 3/2010 | Brown et al. | |
| 2010/0251264 A1* | 9/2010 | McGuire et al. | 719/317 |
| 2010/0262451 A1* | 10/2010 | Bahrami et al. | 705/8 |
| 2010/0312590 A1 | 12/2010 | Arunachalam et al. | |

FOREIGN PATENT DOCUMENTS

GB    2 447 673    9/2008

OTHER PUBLICATIONS

Anonymous. "iTKO to Demonstrate SOA Quality Across the Lifecycle at Software AG's Integration World 2007." Business Wire. New York, Oct. 30, 2007.*
Anonymous. "Software AG; Software AG Expands Application Modernization Portfolio with Relativity Technologies Partnership." Computer Business Week, Atlanta, Mar. 24, 2008, p. 19.*
Anonymous. "Software AG; Software AG: #1 Vendor Worldwide in SOA Governance." Information Technology Business, Atlanta, Jun. 9, 2009, p. 87.*
Arsanjani, Ph. D, Ali. "Service-Oriented Modeling and Architecture." IBM DeveloperWorks®, Nov. 9, 2004.*

(Continued)

*Primary Examiner* — Susanna M Meinecke Diaz
(74) *Attorney, Agent, or Firm* — Nixon & Vanderhye PC

(57) ABSTRACT

Certain example embodiments relate to algorithmic and/or programmatic approaches to identifying service candidates from among business process functions. In certain example embodiments, a method of analyzing functions of a business process model for possible exposure as service capabilities in a service-oriented business process system (SO-BPS) is provided. A business process model defined by a plurality of objects is received, with each said object having metadata attributes associated therewith. Business process analysis intelligence is obtained at design time for each said object. Process performance intelligence at run time is obtained for each said object. Indicators corresponding to the design time and run time gathered intelligence are stored together with the metadata attributes for the corresponding object. Via at least one processor of the SO-BPS, an overall service candidate algorithm is applied to the stored indicators to arrive at a total service eligibility value for each process function in the model.

26 Claims, 12 Drawing Sheets

OTHER PUBLICATIONS

Zimmerman, et al. "Elements of Service-Oriented Analysis and Design." IBM DeveloperWorks®, Jun. 2, 2004.*

Feuerlicht, et al. "Understanding Service Reusability." Faculty of Information Technology, University of Technology, Sydney, Australia. Systems Integration 2007.*

Software AG. ARIS SOA Architect. [online] [retrieved Jun. 27, 2011] http://www.softwareag.com/corporate/images/SAG_ARIS_SOA-Arch_FS_Oct10-web_tcm16-78622.pdf.

Portfolio Manager—SOA Planning Governance. [online] [retrieved Jun. 22, 2011] http://www.soa.com/products/portfolio_manager.

Modeling SOA: Part 1. Service Identification [online] [retrieved Jun. 22, 2011] http://www.ibm.com/developerworks/rational/library/07/1002_amsden/index.html.

Inaganti et al., Service Identification: BPM and SOA Handshake, [online] [retrieved Jun. 27, 2011] http://www.bptrends.com/publicationfiles/THREE%2003-07-ART-BPMandSOAHandshake-InagantiBehara-Final.pdf.

F. Kohlmann, "Service Identification and Design—A Hybrid Approach in Decomposed Financial Value Chains," EMISA, 2007, pp. 14, [online] [retrieved Jun. 22, 2011] http://web.iwi.unisg.ch/org/iwi/iwi_pub.nsf/wwwPublYearEng/6C6CCCD3ADA618AFC12576E00047F9BA.

Karsten Klose et al., "Identification of Services—A Stakeholder-Based Approach to SOA Development and its Application in the Area of Production Planning," pp. 1802-1814, [online] [retrieved Jun. 22, 2011] http://csrc.lse.ac.uk/asp/aspecis/20070087.pdf.

Jens Weller et al., "Meet the Challenge in Service Identification: A ratio-based approach," [online] [retrieved Jun. 22, 2011] http://www.pacis-net.org/file/2009/%5B101%5DMeet%20the%20challenge%20in%20service%20identification_%20A%20ratio-based%20approach.pdf.

Rana Yousef, "A Semantically Enriched Framework to Derive Software Service Oriented Models from Business Process Architectures," [retrieved Jun. 22, 2011] www.istudies.net/ojs/index.php/journal/article/download/56/45.

Leonardo Guerreiro Azevedo et al., "A Method for Service Identification from Business Process Models in a SOA Approach," pp. 99-112, [retrieved Jun. 22, 2011].

Birkmeier et al. "Zur Systematischen Identifikation von Services: Kriterien, aktuelle Ansatze and Klassifidation," pp. 255-272 (with English-Language Translation).

* cited by examiner

| Process Functions | Occ() | OrgRedundancy() | AppRedundancy() | Invoc() | Reuse() | DataCoupling() | DataCohesion() | OutTasking() | Visibility() | OrgOcc() | AppOcc() | BusinessRelevance() | Total Service Eligibility |
|---|---|---|---|---|---|---|---|---|---|---|---|---|---|
| | | Process Indicators | | | | Data Indicators | | Organizational Indicators | | | | Goal & Event | |
| | 6 | 2 | 3 | 7 | 18 | 3 | 2 | 0 | 1 | 2 | 2 | 1 | 14 |
| | 4 | 3 | 2 | 4 | 13 | 1 | 0 | 1 | 0 | 1 | 1 | 1 | 15 |

FIG. 1

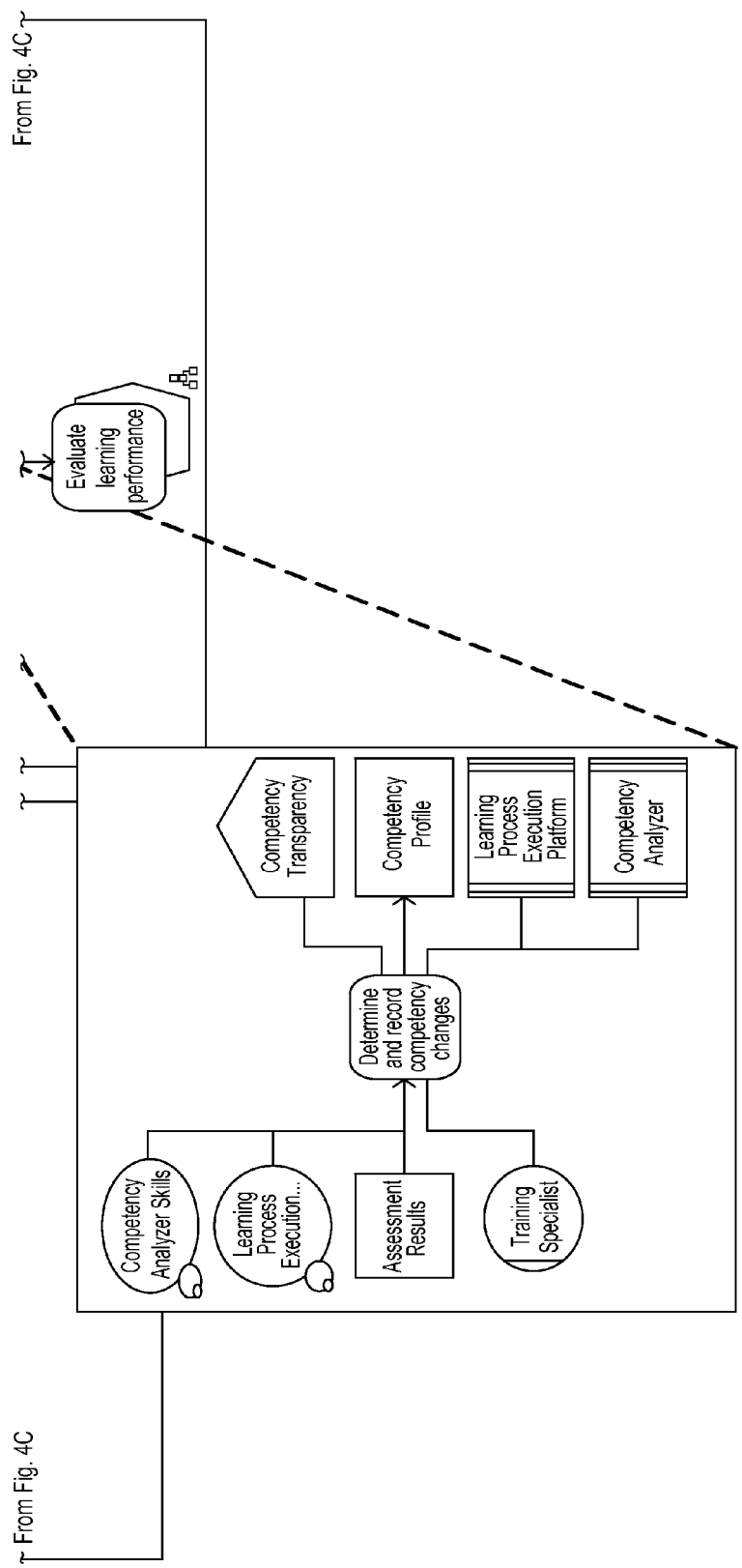

SYSTEMS AND/OR METHODS FOR IDENTIFYING SERVICE CANDIDATES BASED ON SERVICE IDENTIFICATION INDICATORS AND ASSOCIATED ALGORITHMS

FIELD OF THE INVENTION

Certain example embodiments described herein relate to algorithmic and/or programmatic approaches to identifying service candidates from among business process functions. In certain example embodiments, there are provided techniques for gathering indicators based on design time business process analysis intelligence and run time process performance intelligence, storing such indicators together with metadata attributes for each model object, performing service candidate analysis, and/or responding to service requests.

BACKGROUND AND SUMMARY OF EXAMPLE EMBODIMENTS OF THE INVENTION

A business process is a series of enterprise tasks, often undertaken for the purpose of creating valuable output for an internal or external customer. For instance, a business process may give organizational actions structure across time, place, and functions. Business processes have become a chosen means to describe, analyze, execute, and control operational structures across departments, business units, and even business partners.

Business process management (BPM) aims at their improvement for the sake of overall business success. Amongst others, software-enabled business process automation is an instrument to increase process efficiencies and effectiveness. Business process models have been established to specify processes throughout BPM projects. For automation purposes, for example, they document and structure process information prior to their transformation into executable (e.g., code-based) specifications. Modeling and transformation oftentimes are prerequisites for sound process automation.

Business process models help describe the logical and timely flow of business processes as a map. They may help visualize process activities as graphical symbols, possibly connecting them to a linear or other order. Logical operators may indicate when the flow splits into alternative or parallel paths, when they merge again into one, etc. This so-called control flow is a part of a business process model. The control flow may be complemented by additional model elements that differ depending on the perspective. A conceptual-organizational perspective targets the organizational process context including, for example, intra- and inter-organizational division of labor, interaction between human activities, their technical support, product outcome, etc.

The modeling language EPC (event-driven process chain) has prevailed as a de-facto standard for such conceptual business processes. It complements process activities by organizational resources responsible, input required, and output produced, supporting software application systems, organizational objectives, risks, etc. While being rather easy to use even by non-technical process analysts, it also includes important information on the logical flow, which makes it a semi-formal requirements basis for technical process implementation. It is at the transformation from conceptual into technical business process models where business process modeling changes the perspective from organizational design into technical engineering.

Model-driven process automation passes the control flow described in a conceptual business process model on to a technical business process model. Here, it is complemented by technical information such as, for example, process variables for storing process information during execution, online forms for user interaction, exceptions and their handling, communication patterns (asynchronous/synchronous), consistent data exchange, etc. To make a process executable, process activities typically are assigned to automated software functionality or to semi-automated user interfaces. Depending on the chosen modeling language and the targeted deployment system, this transformation may result in a second graphical diagram (e.g., in BPMN 2.0), directly into a code-based script (e.g., XPDL, BPEL, or the like), etc.

The resulting technical process models are to be deployed into the process engine of a business process management system (BPMS) or workflow management system (WFMS), which allows for starting, executing and tracking instances of this process efficiently.

The idea of using business processes as blueprint for cross-application software systems is as old as the concept of workflow management systems (WFMS) and enterprise application integration (EAI). One factor making business process automation a real technical challenge, though, is the plethora of heterogeneous and increasingly distributed software systems to be integrated and connected along a given process flow.

Most recently, service-oriented architectures (SOA) has attempted to meet this integration challenge by exposing and integrating remote software functionality through well-defined software service interfaces. Early proponents conceived of SOA instead as a specific style of distributed software architectures based on the so-called find-bind-execute relationship between service providers and consumers. More recent notions advance this integration view towards the potential SOA offers for business process automation. They put process automation into the center of the SOA discussion. The capability to compose services loosely opens new avenues to implementing business processes flexibly following dynamic business requirements. The adoption of standardized service interfaces allows for the reusing of services in different business processes, as well as flexibly replacing services according to evolving business requirements. In this sense, SOA has been considered a paradigm for organizing and utilizing distributed capabilities that may be under the control of different ownership domains.

Web services represent one of the most recent incarnations of service-oriented software technologies. Unlike previous service technologies, web services leverage and further protocol and data standards.

Scientific discourse and best practices of service-oriented architectures provide a number of service-oriented design principles. While the SOA approach reinforces well-established, general software architecture principles of interface-orientation, interoperability, autonomy, and modularity, it also adds additional themes of process-orientation.

Thus, service-oriented design seeks to improve business process flexibility by the separation of process structure (e.g., process flow) and process institutionalization (e.g., selection of service capabilities conducting process activities). Business process systems benefit from service-orientation in several aspects. First, process structure is revisited to prepare for well-defined, comprehensive functional interfaces allowing plug-and-play services to form new business processes. Second, IT support and technical infrastructure, as well as personnel assignment, are addressed by considering process institutionalization alternatives. They affect cost-effectiveness as much as load balancing and performance figures. Third, aspects of data redundancy and data integration are of interest for service-oriented business process systems (SO-BPS), since cross-organizational service provision risks to increasing data redundancy and data control.

Service identification, which involves locating process activities that appear worthwhile being exposed as service, is considered a part of service-oriented system engineering and is at the crossroad between conceptual and technical business process models. Furthermore, service identification typically is one of the first conceptual activities to be conducted in an SO-BPS project. Quality of identified service candidates helps determine overall system quality to a large extent. Flaws in this activity can propagate to all later activities, potentially causing cost-intensive iterations. Because of the potentially high impact of service identification, systematic and thorough techniques are desirable. Potential service functionality can be searched for in different contexts. While the business context sets the structural and behavioral service requirements, the IT context represents existing software systems as possible service providers. However, as the latter refers to an IT inventory analysis, it risks ignoring real business needs. Therefore, service identification in this case is considered as transforming business process requirements into well-defined service requirements.

It is noted that a majority of current service-oriented development models take business process models into account. However, it is believed by the inventor of the instant application that none of these current approaches specifies which prerequisites must be met by business process models to be a suitable basis for service-oriented system design. Indeed, they must meet some minimum design standards to be a useable blueprint for service identification as a prerequisite for service composition and process automation.

Therefore, service identification remains a purely manual consulting service missing any systematic and quantitative support. Service identification has been addressed as a major activity of various academic service-oriented development models, but it hardly has been taken on by SOA governance software. Even so, they are mostly vague guidelines that apparently lack any metric to evaluate service candidates quantitatively. Some service identification approaches miss taking process or business structures into account by only technically analyzing software landscapes for service exposure. The existing few approaches that identify service eligibility of a process function in enterprise models are limited to one service design principle (e.g., data cohesion) and do not leverage contextual information stored in extensive business process architecture models. Thus, it is believed by the inventor of the instant application that none of the existing tools and methods available provides an automatic mechanism (e.g., an algorithm) to identify service candidates among business process functions.

Thus, it will be appreciated by those skilled in the art that there is a need in the art for techniques that provide an algorithmic and/or programmatic approach to identifying service candidates from among business process functions.

One aspect of certain example embodiments of this invention relates to using conceptual business process models as a comprehensive and valuable information basis for service identification.

An aspect of certain example embodiments of this invention relates to an algorithmic and/or programmatic approach to identifying service candidates from among business process functions.

Another aspect of certain example embodiments relates to evaluating a process step as a service candidate.

Another aspect of certain example embodiments relates to providing governance support for service planning governance process, while also linking to business process models and incorporating business-oriented modeling.

Another aspect of certain example embodiments relates to analysis features that support domain composition (which describes service requirements from business processes) for service identification.

Another aspect of certain example embodiments relates to an algorithmic and/or programmatic tool for business process-driven service identification.

Still another aspect of certain example embodiments relates to the flagging of indicators for reusability.

Still another aspect of certain example embodiments relates to identify service candidates having a richness in business semantics provided by event-driven process chains.

Yet another aspect of certain example embodiments relates to goal-service modeling (GSM) as a second activity complementing top-down process decomposition and bottom-up asset analysis.

Yet another aspect of certain example embodiments relates to determining or calculating indicators including, for instance, process indicators, data indicators, organizational indicators, and goal and event indicators.

Yet another aspect of certain example embodiments relates to representing determined or calculated indicators in a Service Identification and Evaluation Matrix (SIEM).

Yet another aspect of certain example embodiments relates to applying a formula to weight determined or calculated indicators to arrive at a score indicative of the total service eligibility.

Yet another aspect of certain example embodiments relates to comparing total service eligibility scores to a threshold, e.g., to filter out functions that do not qualify as candidates for service eligibility.

In certain example embodiments, a method of analyzing functions of a business process model for possible exposure as service capabilities in a service-oriented business process system is provided. A business process model defined by a plurality of objects is received, with each said object having metadata attributes associated therewith. Business process analysis intelligence is obtained at design time for each said object. Process performance intelligence at run time is obtained for each said object. Indicators corresponding to the design time and run time gathered intelligence are stored together with the metadata attributes for the corresponding object. Via at least one processor of the service-oriented business process system, an overall service candidate algorithm is applied to the stored indicators to arrive at a total service eligibility value for each process function in the model.

According to certain example embodiments, a request for a service candidate may be responded to by recommending at least one process function having a sufficiently high total service eligibility value.

According to certain example embodiments, the indicators include or consist of process indicators, data indicators, organizational indicators, and goal and event indicators. According to certain other example embodiments, the indicators include or consist of at least one reusability indicator for functions in the model, at least one data coupling indicator for functions in the model, at least one data cohesion indicator for functions in the model, at least one stakeholder integration indicator for functions in the model, at least one organizational involvement indicator for functions in the model, at least one goal-oriented indicator for service eligibility, and/or at least one event-oriented indicator for service relevance. The total service eligibility value may be a weighted combination of the indicators, and the weights may correspond to one or more objectives to be reached with the resulting service-oriented business process system in accordance with certain example embodiments. As one example, the overall service candidate algorithm comprises, for each said function, obtaining a first value by adding together the expected reusability of the function over a predefined time period, the data cohesion of the function, out-tasking and visibility variables respectively indicating the extent to which execution of the function can be out-tasked to stakeholders and can be made visible to stakeholders, obtaining a second value by subtracting from the first value a degree of data coupling for the function, a maximum number of organizational units involved in the function, and a maximum number of application systems involved in the function, and multiplying the second value by a business relevance indicator for the function to obtain the total service eligibility value for the function. According to certain example embodiments, a function may be exposed as a service capability if the total service eligibility value for the function exceeds a predetermined threshold value.

According to certain example embodiments, the design time intelligence may be gathered by executable program logic such as, for example, scripted macros or reports, and/or the run time intelligence may be gathered via an interface to a process monitoring tool or other executable program logic.

According to certain example embodiments, the total service eligibility values for the process functions may be ranked. For instance, the ranked total service eligibility values may be organized into and/or displayed in groups based on the rankings. In certain instances, the groups may be formed so as to approximate a normal distribution.

In certain example embodiments, a method of defining or refining a business process model is provided. A representation of at least a portion of the business process model is graphically displayed on a display of a computer system, with the portion including a plurality of objects. A user is able to select an object of the model via a user interface. In response to a user request received via the user interface, metadata attributes of the selected object are displayed on the display of the computer system. Indicators corresponding to gathered business process analysis intelligence and/or gathered process performance intelligence are displayed together with the metadata attributes in a matrix format. A total service eligibility value is calculated via at least one processor for each process function in the model based on a weighted summation of the indicators. The indicators corresponding to the business process analysis intelligence are gathered at design time via scripted macros or reports and the indicators corresponding to the indicators corresponding to the process performance intelligence are gathered at run time via an interface to a process monitoring tool.

According to certain example embodiments, a request for a service may be received from the user, and/or at least one service candidate may be displayed to the user as a result of the request. This may in certain instances involve plurality of service candidates are displayed. The service candidates may, for example, be ordered based on their respective total service eligibility values. In some cases, each said service candidate is displayed only if it exceeds a predetermined threshold value. In other example instances, exactly one service candidate is displayed, with the one displayed service candidate corresponding to the function having the highest total service eligibility value.

Non-transitory computer readable storage mediums tangibly storing instructions for performing the above-summarized and/or other methods also are provided by certain example embodiments.

Analogous systems also may be provided in by certain example embodiments. For instance, certain example embodiments relate to a service-oriented business process system for analyzing functions of a business process model for possible exposure as service capabilities. A non-transitory computer readable storage medium includes a representation of the business process model, with the business process model being defined by a plurality of objects. Each said object has metadata attributes associated therewith, and the metadata attributes also are stored in the computer readable storage medium. A first computer-executable intelligence gathering module is configured to obtain business process analysis intelligence at design time for each said object. A second computer-executable intelligence gathering module is configured to obtain process performance intelligence at run time for each said object. A computer-executable analysis module is configured to (a) receive indicators corresponding to the design time and run time gathered intelligence, and (b) apply a service candidate algorithm on some or all of the indicators to arrive at a total service eligibility value for each process function in the model. The modules are executable via at least one processor of the system.

These aspects and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 1 is an illustrative Service Identification and Evaluation Matrix in accordance with certain embodiments;

FIGS. 4A-4D illustrate the sample learning management process from end-to-end and provides detailed views on two sample leaf level EPC diagrams;

DETAILED DESCRIPTION OF EXAMPLE EMBODIMENTS OF THE INVENTION

Figure 2:
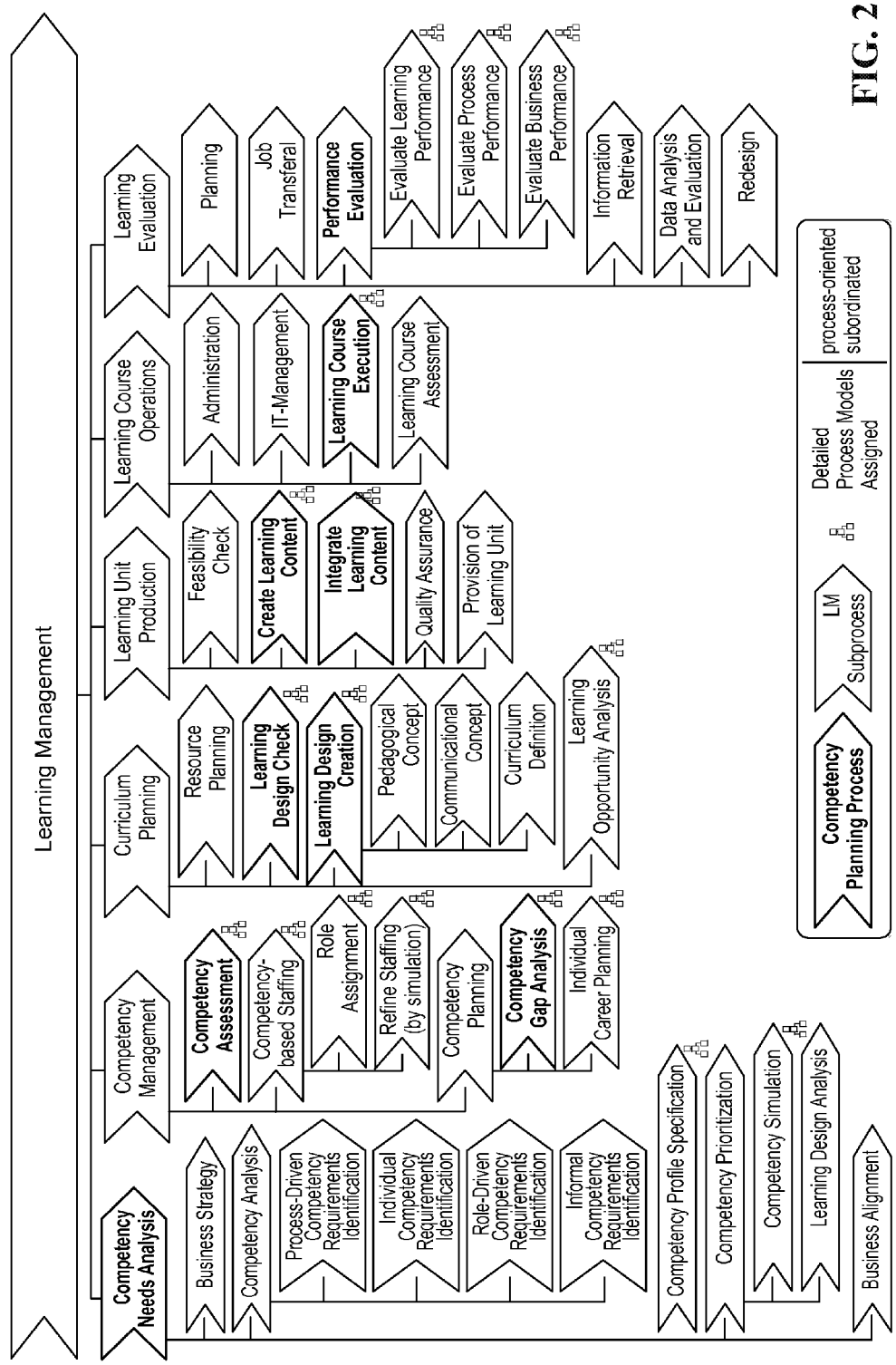
FIG. 2 illustrates the example learning management process hierarchy in three levels of detail.

Certain example embodiments involve multi-perspective eligibility indicators, functional granularity identification, process-oriented reusability identification, data-oriented autonomy identification, organization/stakeholder oriented identification, goal-oriented identification of business relevance, event-driven identification of business services, consolidation of service eligibility, and/or business service specification.

It may be desirable to analyze multi-perspective eligibility indicators in certain example embodiments. For example, acknowledging the value of business-orientation for service design, the SO-BPS methodology may start with a top-down business service identification based on the lowest level of the business process hierarchy that provides business process models.

Because process improvements (e.g., reducing existing process inefficiencies) are one driver for the adoption of service-orientation, many SO-BPS projects would be business process optimization projects. However, it may not be desirable to always deploy the entire spectrum of classical business process improvement techniques in all such endeavors. Therefore, the question of "as-is" versus "to-be" models is bypassed in certain example embodiments through the provision of a clear recommendation to use a business process hierarchy that documents the current status of current operations in sufficient detail (e.g., complying with modeling conventions), while assuming that business processes are structurally efficient (e.g., there are no bottlenecks, sequential instead of parallel processing, etc.). Hence, the bases for business service identification may be thought of as detailed, as-is business process models featuring high-quality operations.

One guidepost for high-quality service design implies that (elementary) services encapsulate organizational units, legal constraints, master data from update data, products, and markets, as well as different vertical integration levels. This notion argues in favor of a multi-perspective analysis of business process models to reap superior (or at least improved) service candidates. Correspondingly, the guidelines may be structured along the SO-BPS views, e.g., as introduced and elaborated on below.

Thus, it may be desirable to implement functional granularity identification in certain example embodiments. Being one SOA design principle, abstraction and business process orientation often is translated into coarse, business-oriented granularity that meets various demands. However, excessively coarse granularity impedes general reusability of services which is another vital design objective. The tradeoff between fine-grained and coarse-grained services has been addressed by many but has not yet resolved. The advantages of small services are their variability and reusability promoting more adaptable systems. However, this flexibility comes with a price in the form of complexity caused by a large number of services that is difficult to manage.

Coarse grained services, however, allow only for a few purpose-build use cases that fit only in a specific situation. Once the initial situation changes, new services may need to be implemented, very often providing redundant functionality. Overall, identifying the right degree of granularity is an intricate task in SO-BPS design, and it is unlikely that there is a single correct size for all services. Business process decomposition has yielded the most fine granular, yet business relevant functions. Thus, both design criteria catering towards demand orientation (e.g., abstraction and business process orientation) have been addressed. It would be desirable to address principles of process autonomy and modularity before the final tailoring of functions to service candidates is achieved. Catering towards the autonomy principles of high cohesion and loose coupling, clustering techniques known from social network analysis or component-based software design may be applied to business process models. It is possible to cluster business process functions by deleting edges with the highest "betweenness", or the number of shortest paths between pairs of vertices (business activity, IT systems, etc.) that run along it. The resulting clusters may include functions that are good service operation candidates forming a service.

In certain instances, it may be desirable to take into account process-oriented reusability, e.g., when service identification within an SO-BPS concerns many or all business processes. To identify reusability of functions respective service capabilities, the inter-process dependencies of functions across a given set of numerous process models may be analyzed. The number of occurrences of the same function over several business processes may help to indicate its reusability in different business contexts. A prerequisite for this analysis may be that identical functions carry identical names so that semantically equal functions can be identified by comparing their labels. Two identical functions share the same input and output data. As long as identical data objects carry identical names, comparing input and output data is another way to check for identical functions. Process modeling environments, such as the ARIS business architect, for example, support multiple occurrences of the same function object. Thus, identical activities may not need to be located and counted manually.

The reusability of functions may be approximated by the further assessment of the function's frequency over the course of time (e.g., during run-time). Therefore, a history of process instances may be desirable. This is most feasible with any type of software support logging process performance and analyzing process instances. However, knowledge-intensive business processes characterized by manual activities and self-organization are unlikely to be monitored consistently. Interviews with knowledge workers eliciting their typical work behavior may provide the necessitated data. The number of non-identical events triggering a function across all occurrences brings another quality to the assessment, since diverse triggering events indicate an even higher reusability of a function. Similarly, multiple use of a function by different organizational or application resources also demonstrates its reusability. The following example statements define example indicators of functional reusability and sums them up to an overall reusability indicator:

$Occ(F_i)$=number of occurrences of function i across all process models $OrgRe(F_i)$=number of non-identical organizational units providing function i across all occurrences $AppRe(F_i)$=number of non-identical application systems supporting function i across all occurrences $Invoc(F_i, t)$=number of invocations of function i over the course of time t $Reuse(F_i, t)=Occ(F_i)+Invoc(F_i, t)+OrgRe(F_i)+AppRe(F_i)$ $F_i$: Function i $Reuse(F_i, t)$: Expected reusability of function i over the course of time t Service criteria of cohesion and coupling do not only concern functional aspects, but also aspects of data exchange and complexity of exchanged data objects. One approach may be to measure the degree of coupling of functions by assessing its data exchange behavior. The fewer functions use the same data objects and the less complex shared data objects are, the looser the coupling of functions tend to be. The complexity of shared data objects may be determined by the number of mutual relationships as modeled in a data model. As a side effect, low complexity of input/output data relates to lower data volumes, as it is required for improved overall performance. The following example statements define example indicators of functional data coupling:

$$DataCoupling(F_i) = |S_{ia}| + \sum C(S_{ij})$$
$$S_{ij} = D_i \cap D_j$$
$$S_i = \bigcup_j S_{ij}$$

Fi: Function i
Di: Set of data objects used by function i
Da: Set of all data objects in use
$C(S_{ij}) \in N$: Degree of data complexity, or number of relationships between data objections of the set $S_{ij}$
DataCoupling($F_i$)$\in N$ Degree of data coupling of function i A further indication about the autonomy of a function is given by the cohesion of the data objects used by the function. One can derive this figure of cohesion based on the number of mutual relationships between data objects. The underlying assumption is that a function can be considered cohesive if its data objects have few relationships with each other. Normalizing the number of relationships by subtraction from the number of data objects delivers a value that indicates the degree of cohesion. The following example statements define the indicators of functional data coupling:
DataCohesion($F_i$)=$N_i$−$K_i$
$K_i$=$C(D_i)$
$N_i$=|$D_i$|
$D_i$=$ID_i \cup OD_i$
|$D_i$|$\in N$: Number of data objects used by function i
$ID_i$: Set of input data of function i
$OD_i$: Set of output data of function i
$D_i$: Set of data objects used by function i
DataCohesion($F_i$): Data cohesion of function i The number of data objects a function operates on may be an additional indicator for service eligibility. In certain instances, it may be only one input and one output data object. This constraint corresponds to the criterion that service granularity be sufficiently fine to describe all processing steps on business objects. On top of that, master data objects and inventory data objects may be processed by different services. Interface-orientation further asks for the unambiguous definition of input and output parameters. Thus, as a general rule, data objects may be specified by underlying data models.

Distribution of service-oriented systems refers, among other things, to different organizational and technical resources providing, brokering, or consuming services. Organizational units assuming one of these three roles may be thought of as being stakeholders. Whereas existing service-oriented procedure models tend to neglect different stakeholders' perspectives, an organizational service identification approach focuses on a stakeholder's perspective. Exploiting service marketing research on customer integration, the "line of interaction" and the "line of visibility" may be applied as a theoretical foundation of the criteria proposed for service identification. Following this argumentation, criteria for service eligibility of a function are whether it can be taken over by stakeholders (shifting the line of interaction towards the stakeholder) or whether (parts of) it can or must be made visible to the stakeholder. Thus, the "out-tasking" and "visibility" criteria assess the extent to which execution of the function can be out-tasked to stakeholders or at least made visible to them. Whereas technical service design criteria typically are only marginally considered, the example approach described herein may take into account possible service scenarios and their expected business value. The integration of the service customer refers to the external factor intervening with service execution, a notion as it is widely held in the discipline of service marketing. From a measuring point of view, eligibility for out-tasking or opening a function to service stakeholders is difficult to represent in figures. The following example statements define out-tasking and visibility as binary variables:
Outtasking($F_i$)$\in \{0,1\}$
Visibility($F_i$)$\in \{0,1\}$ Beyond the assessment of possible stakeholder integration, the number of organizational units also represents a potentially relevant indicator. Having no organizational unit involved implies full automation. If only one organizational unit (and no application systems) is attached, the function may be considered a manual task. Semi-automated functions may have both an organizational unit and an application systems assigned. The involvement of more than one organizational unit may indicate team efforts. A function may be assigned either to one organizational unit, to one application system type, or to the combination of both. Multiple organizational units or application system types may sometimes be viewed a reason to decompose. The following example statements define variables for organizational and application resources involved:
OrgOcc($F_i$,$P_i$)$\in N$: Number of organizational units involved in function i occurring in process j
AppOcc($F_i$,$P_i$)$\in N$: Number of application systems involved in function i occurring in process Whereas functions attached to multiple application systems types are likely to be decomposable, team functions (e.g., multiple organizational units) may imply collaborative work that is sometimes difficult to separate further. Such tasks can be exposed as human group services or checked for (semi-)automation by the use of software reducing the number of humans involved (e.g., renewal of process institutionalization). Manual activities (e.g., human services) can be further supported by fine granular software services.

In justifying the budgeting and development of an SO-BPS, it oftentimes is desirable to satisfy business goals and objectives. Like any other investment, SO-BPSs are frequently expected to demonstrate their value to the business on an ongoing basis. In order to bridge the gap between business propositions and service realizations and provide traceability of services to business drivers, certain example embodiments involve goal-service modeling (GSM) as a second activity complementing top-down process decomposition and bottom-up asset analysis.

Example GSM techniques work well with business process modeling. In some instances, every process step supports at least one business goal and every business goal is supported by at least one function. Complemented by the relationship between service capabilities and process functions, this dependency allows for transitively allocating business objectives to service over functions. The ARIS methodology, for example, includes goal modeling and proposes goal hierarchies that link a subordinate goal with several overriding goals and assign goals to functions that provide adequate support. A solid business process analysis project may start with specifying the objectives of the organization. Because high-level corporate goals are usually stated in ways that are too lofty for service identification, it is advisable to decompose the goals into sub-goals and keep decomposing until that a sub-goal is actionable. Actionable sub-goals are capable of being acted on, e.g., such that one can identify a function that supports this actionable sub-goal.

Functions linked to business goals would then have a higher probability of being prioritized for service realization and funded for subsequent design and implementation. This allows using GSM as a scoping mechanism that reduces the complexity of the SO-BPS problem domain by detecting a functional area that provides the highest impact on the business side. The following example statements define business objective relevance as an indicator for service eligibility:

$BOR(F_i) \in \{1,2,3\}$ $BOR(F_i)$ Business objective relevance of function i

Event-oriented process modeling and event processing implicates a specific consideration of business events. There are at least two approaches of service identification that take business events into account. One can identify data service operations by aggregating data attributes that are processed at the same time (e.g., triggered by the same business event). For each set of aggregated data attributes, a data service operation is created. In addition, this concept proposes a top-down event-driven method for defining discrete business services. Identifying non-trivial, significant business events includes adequate business responses (e.g., functions triggered by the events). Those event responses define the requirements for the interface design (e.g., for the service capabilities).

Initiating service identification on an events basis provides an additional approach on the road towards a possibly complete, adequate requirements basis for services. Process-oriented service identification already took into account how many non-identical events trigger a function across all business processes. From an event perspective, it is now analyzed which functions are triggered by non-trivial, significant business events. Therefore, business events are identified and checked for responsive functions. Functions related to business events rise in business value and are therefore prioritized in their eligibility. Unlike the other event-oriented value, this does not indicate potential reusability of a function but its business relevance. It adds to the business relevance driven by business objectives. The example statements below define business event relevance of a function:

$BER(F_i) \in N$ $BER(F_i)$: Number of business events function i responds to $BusinessRelevance(F_i)=BER(F_i)+BOR(F_i)$ Each indicator elicited may be documented in a service identification matrix providing a compound overview on all perspectives of service eligibility. The Service Identification and Evaluation Matrix (SIEM) may take discrete indicator values of the previous analysis and perform calculations, e.g., to transform them into eligibility values across dimensions. An additive formula with configuration parameters is therefore proposed in certain example embodiments. The function types of the lowest hierarchy level (and not their occurrences in a process context) may be evaluated for service eligibility. The rationale behind this approach is that not a single occurrence in one specific process should decide about service eligibility but the overall usage of this function in multiple processes. The indicator-based approach takes up the idea of a service litmus test to underscore the importance of criteria that allows the prioritization of service candidates and a documented justification for the services canceled out in the current project scope but relevant in another future scope.

FIG. 1 is an illustrative Service Identification and Evaluation Matrix in accordance with certain embodiments. The rows in FIG. 1 correspond to functions, whereas the columns are grouped into process indicators, data indicators, organizational indicators, and goal and event indicators. As alluded to above, the values within these categories are additively combined to calculate a score indicative of the total service eligibility.

The design of the summative eligibility formula depends on factors such as, for example, the individual project objectives. Before enforcing a formula design, it may be desirable to take the specific SO-BPS environment, goals, and other relevant and specific factors into account. If B2B scenarios are important to the SO-BPS project, for example, the outtasking and visibility values may be weighted significantly higher than in a pure consolidation project that aims to remove redundancies. In this analysis, the example overall service eligibility formula set forth below is based on the assumption that business alignment is the overall objective. This implies that a service candidate must be business aligned (e.g., traceable back to a business goal). The higher the priority of this business goal, the higher the service eligibility value.

$$ServiceEligibility(F_i)=BusinessRelevance(F_i)[Reuse(F_i,t)-DataCoupling(F_i)+DataCohesion(F_i)+Outtasking(F_i)+Visibility(F_i)-maxOrgOcc(F_i)-maxAppOcc(F_i)]$$

The results of this example formula for each function determine the eligibility of each function to be exposed as a service capability. Having determined a critical value k, one can derive a list of eligible service capabilities by filtering out those functions that have a higher eligibility value than k.

Now that a list of service eligible functions has been determined, corresponding service capability types are specified. Service capability types may represent the required service functionality of a service type that has not yet been implemented or selected. Multiple service capability types may constitute a service type that acts as a container. This complies with the type-level modeling approach chosen for business process design. Each service capability type may be complemented with detailed requirements on possible service implementations.

EXAMPLE

Based on the concept of service indicators described above, an illustration of how they can be used in the domain of corporate learning management processes will now be provided as an example implementation. Of course, it will be appreciated that other service indicators and/or summative techniques may be used in connection with this example implementation. Furthermore, it will be appreciated that the same or different service indicators and/or summative techniques may be applied to different implementations.

The case starts with setting up a service-oriented process architecture for learning management. This endeavor is accomplished in various steps that include as a core task the identification of required service capabilities with an indicator-based service identification and evaluation matrix (SIEM). FIG. 2 illustrates the example learning management process hierarchy in three levels of detail. Sub-processes of the second level are process-oriented subordinates to the top level phases and may be broken down even further into third level sub-processes. Shaded elements represent samples that form an end-to-end process that is referred to in the remainder of this section as competency planning process. As indicated by small assignment icons, the third hierarchy level is further detailed by event-driven process chains assigned to the corresponding sub-process elements. Because this also is the leaf level, they are described and designed in the subsequent section. The sub-processes are described as follows for the purpose of this example:

Competency Needs Analysis identifies competency requirements based on strategic business objectives. Mapping business objectives to business operations, business processes provide a solid basis for collecting competency needs. Job descriptions and role definitions may also contribute to the elicitation process as much as career objectives of individual employees. Once identified, competency requirements are specified following predefined structures. To allow for dedicated performance improvement, competencies are prioritized according to their impact on business objectives. Other dimensions of competency prioritization may be training costs, training availability, or time constraints.

Competency Management matches available competencies with required competencies to identify competency gaps. As a prerequisite, as-is competencies have been assessed. Knowledge about competency gaps supports informed decisions on staffing and role assignment as much as a further definition of competency objectives both on an individual and on an organizational level.

Competency objectives flow into Curriculum Planning activities, which seek to overcome competency gaps by demand-driven learning designs. Pedagogical and communication concepts are aligned with competency objectives. Existing learning designs are exploited for competency development (e.g., learning opportunity exploitation).

Learning Unit Production produces learning content for the planned curriculum or reuses existing ones that match with competency objectives of the learning design. Assigning learning content to single elements of the learning design produces a learning unit being ready for execution.

Learning Course Operations provide learning units to the individual employees facilitated by administrative and technical support. Learning assessment activities determine the progress of the learners and help adapt learning courses to individual needs.

Evaluation measures the impact of learning on performance both on an individual and on an organizational level. The level determines methods of information retrieval and analysis. On the one hand, surveys allow for evaluating individual learning performance. On the other hand, process monitoring delivers performance data on a process level. Evaluation results indicate need and type of redesign activities.

Figure 3:
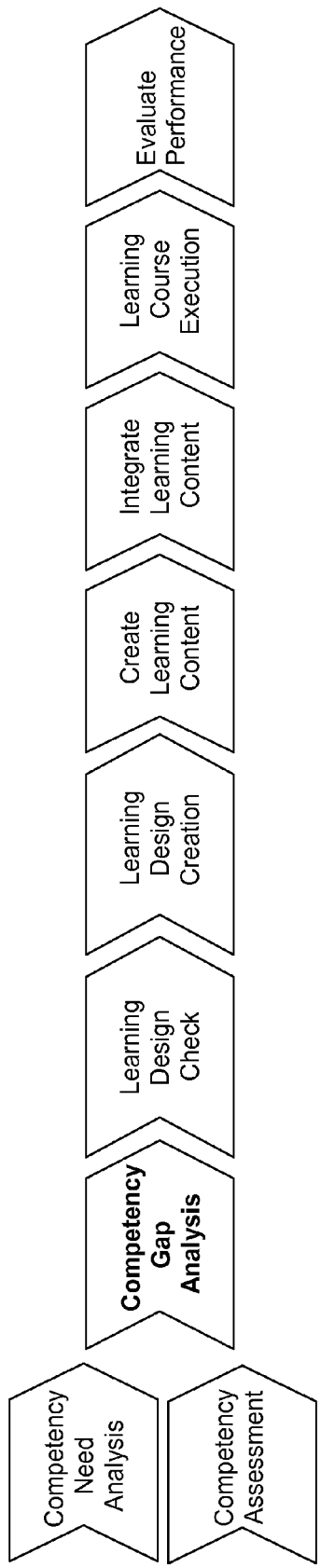
FIG. 3 illustrates a sample process of competency planning and development for the FIG. 2 example.
Figure 4A:
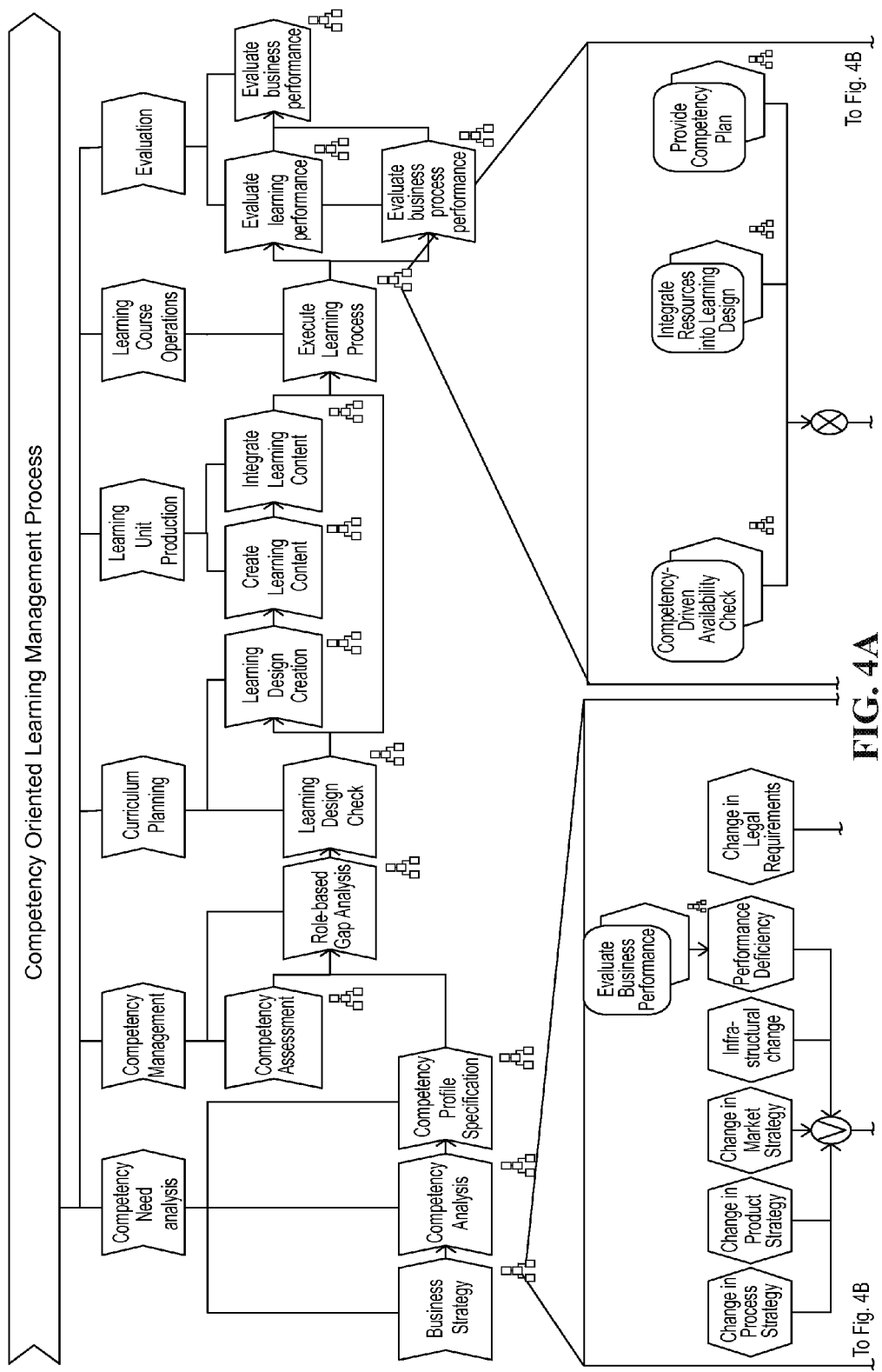
Figure 4B:
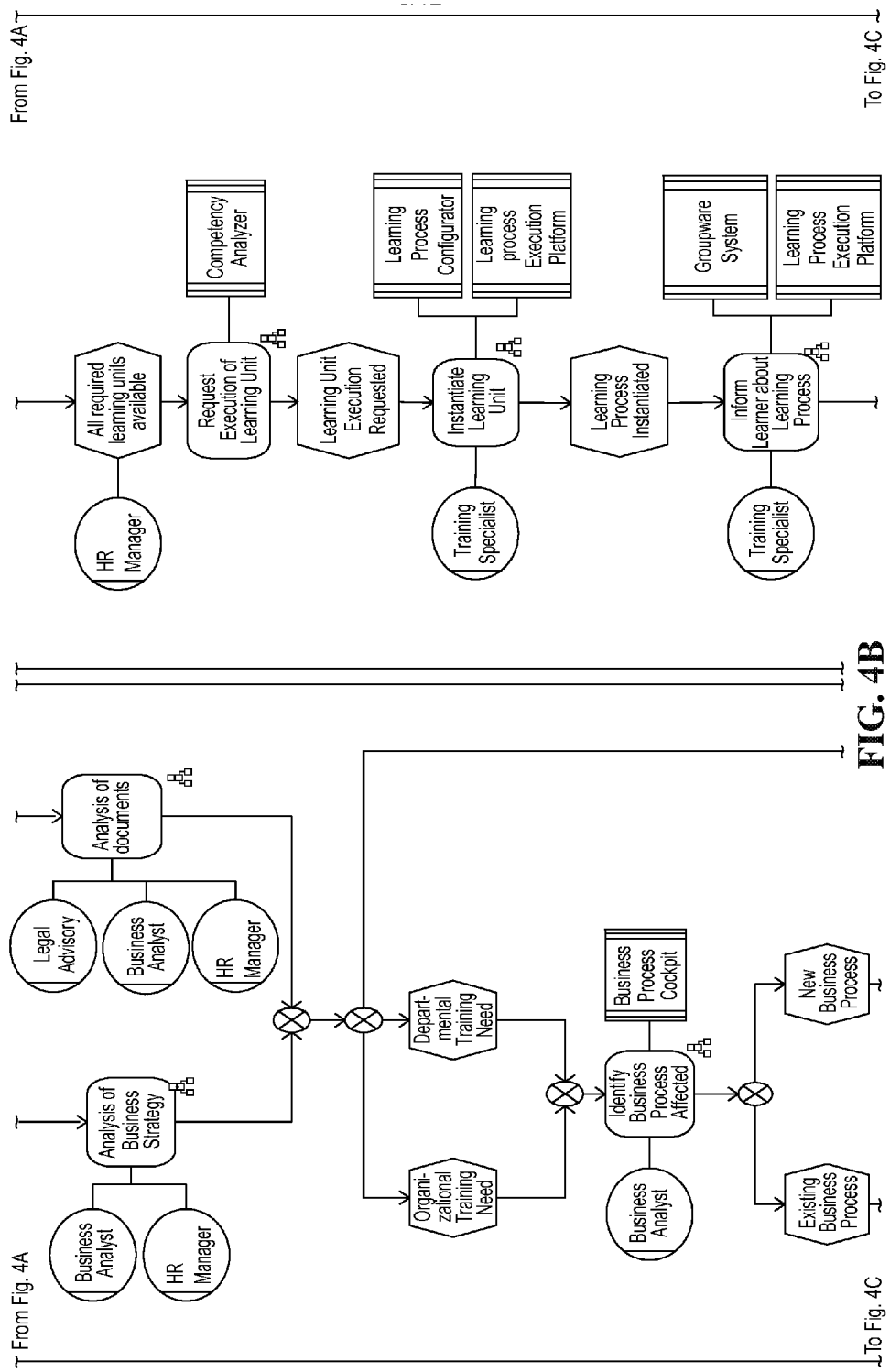
Figure 4C:
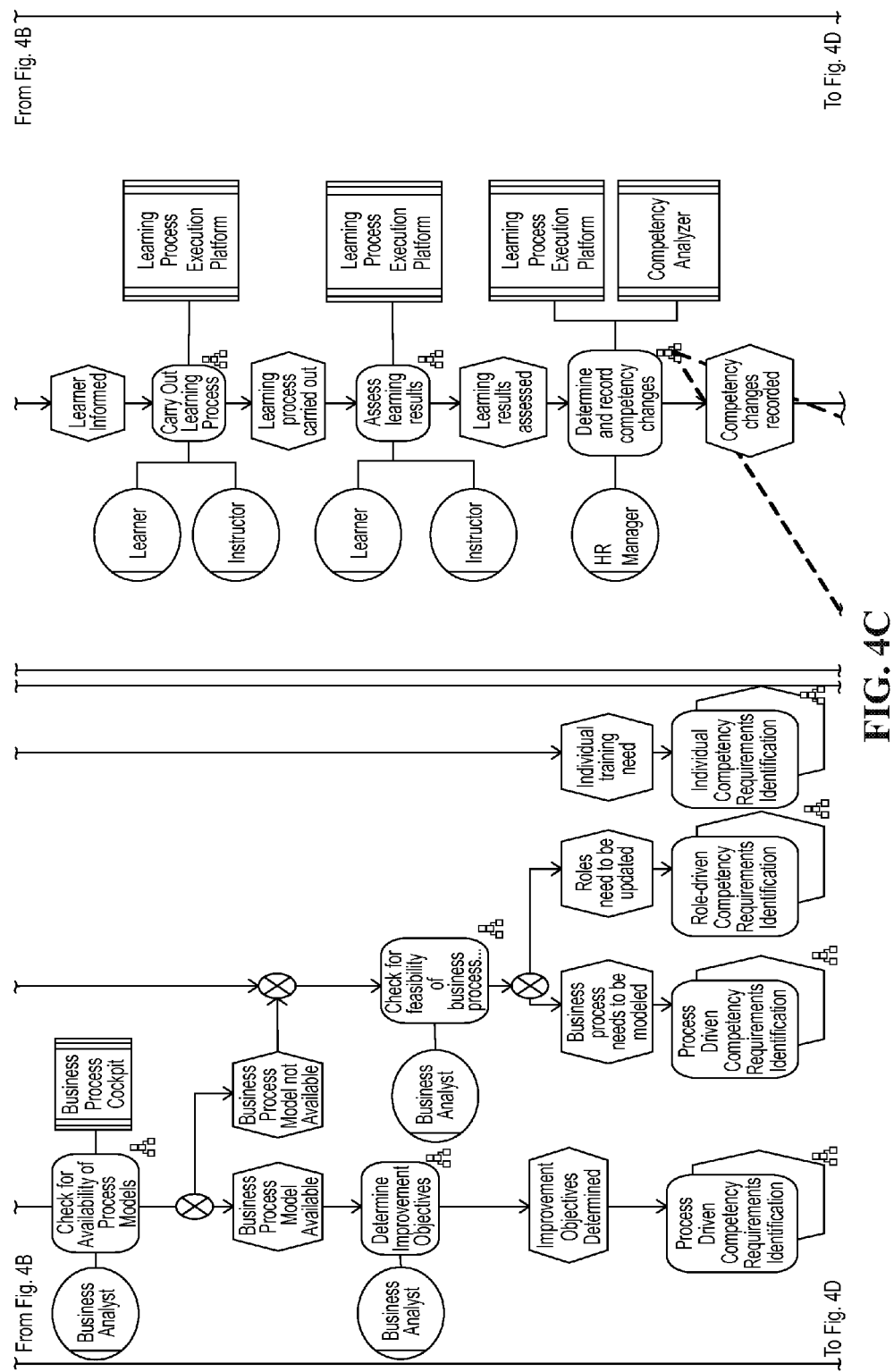

An illustrative end-to-end process that runs across all six sub-processes has been specified and marked as shaded sub-process elements in FIG. 3. It represents a specific use case of learning management that focuses on competency planning and development. It starts with a full competency needs analysis eliciting competency requirements (e.g., from business processes) (process driven competency analysis) and prioritizing them on their impact on process performance (competency simulation). Based on employee competency profiles (competency assessment) the third sub-process merges competency needs with competency availabilities and matches as-is competencies with to-be competencies of their roles (competency gap analysis). The resulting competency gap sets ideal competency objectives that may be refined by competency-oriented process simulation. Competency objectives per role are documented in a competency plan that feeds into curriculum planning. Here, a check is made for reusable learning designs (e.g., pedagogical templates), based on competency annotations (learning design check). They are added to the competency plan and complemented by new learning designs (learning design creation). Before becoming deployable, these learning designs are enriched by learning content that is either already available or produced specifically (create learning content). Integrating learning content into learning designs brings about new learning units that supplement the competency plan.

Following this competency planning process, the competency plan is passed on to the learning course operation phase, where learning units are instantiated per employee to learning courses. After execution of learning courses, which include assessments, learning performance and process performance are evaluated against business objectives. Performance results feed into overall business performance evaluation. Deviations from business and optimization objectives suggest revisiting improvement measures for process and learning designs.

FIGS. 4A-4D illustrate the sample learning management process from end-to-end and provides detailed views on two sample leaf level EPC diagrams. A process context of each process function is specified in assigned function allocation diagrams (FAD). They give information on the organizational unit performing the function, application systems supporting the function, and data input and output of the function, as well as business objectives supported by the function and competencies involved in performing the functions. Person types (organizational unit) and application systems also appear in the EPC diagrams to provide direct information on the current process institutionalization. The degree of automation is emphasized by the different resource types assigned. Manual functions only have organizational units assigned, automated functions have only application systems assigned, and semi-automated functions have both resource types assigned. Further, data elements are integrated into an overall enterprise resource management (ERM) data model.

Having mapped out learning management processes for this example, the next task is to identify service capabilities required by process structures. Service eligibility values of each process function are calculated and analyzed across all process models according to the indicators and formula proposed by the example SO-BPS methodology described above.

Figure 5:
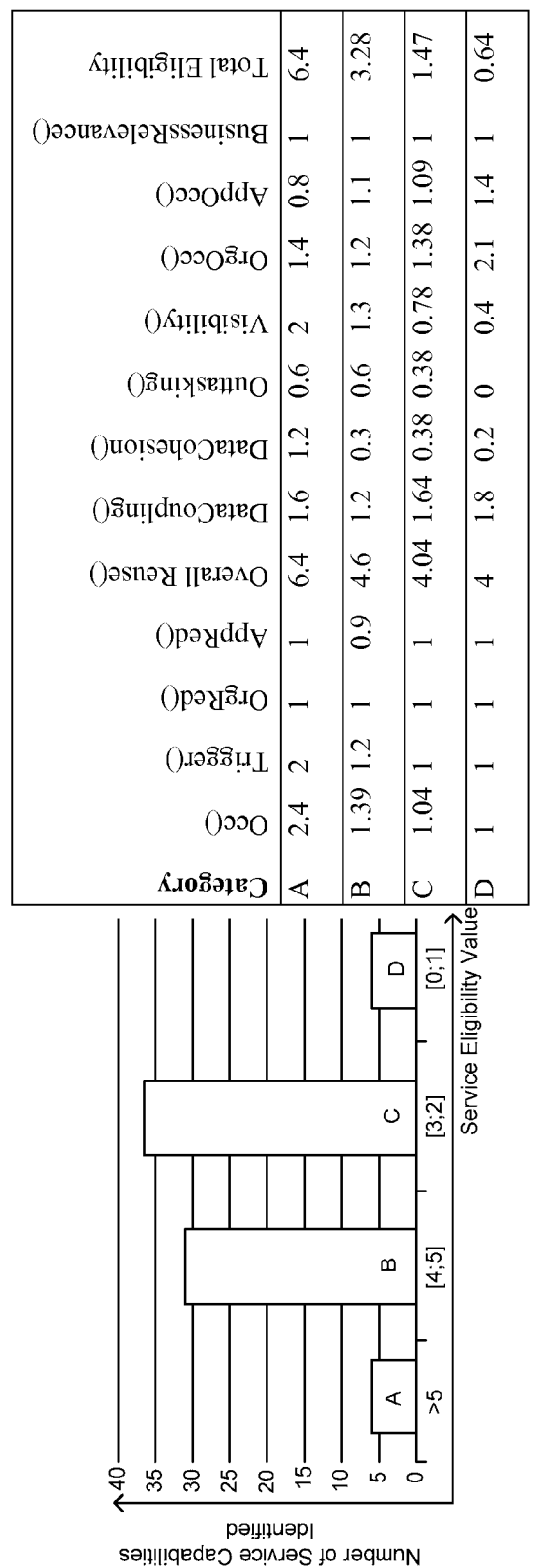
FIG. 5 shows the results of the sample service eligibility analysis, including the overall distribution and average values.

Resulting service eligibility values roughly present a normal distribution that allows categorizing four classes of process functions, as shown in FIG. 5. Out of 81 process functions, five are ranked in category A achieving values of six and better. The process function "determine competency gap" even attains a service eligibility value of 11. The set of A functions excel because of their high reusability, out-tasking, and high visibility values. A majority of 63 functions deliver values higher than two and lower than six. They are split into two categories. Service eligibility of 4 and 5 characterizes B functions. Service eligibility of 3 and 2 characterizes C functions. Those two mid classes exhibit average reusability and varying visibility/out-tasking values. A minority of 14 functions measure less than 1 service eligibility points and are ranked as D functions. Their low values result from low reusability on the one hand and zero visibility and out-tasking values on the other hand.

The FIG. 5 example analysis suggests some general conclusions linked to the specific domain of this case study. Reusability values, especially occurrences, appear rather low. The reason is likely to be the limited scope of the selected end-to-end process in this case study. It is reasonable to assume that the inclusion of neighboring sub-processes of the learning management architecture (e.g., HR processes, event management processes, business strategy processes) would have increased expected reusability of process functions in general as the net effect theory suggests.

Also, data coupling values are rather constant with most process functions attaining values of one or two. This is explained by the fact that most input and output of one function is used by at least one other function. And, with most process functions having one input and one output object, this overlap also evens out at 2. However, data cohesion values are very low, since most input and output objects are not directly related in the underlying data model.

Rather low out-tasking values result from knowledge-intensity of the process. An organization's capability to develop employee competencies consistent with business objectives is a clear differentiator against competitors. Also, learning management processes often pertain to sensitive employee data. Even more, knowledge-intensive tasks are often very specialized and hard to be conducted by others. For these reasons, organizations are reluctant to out-task these tasks what causes a low average value of out-tasking potentials.

On the other hand, visibility reaches rather high values. This can be understood in the context of employee involvement, as well as by the generally collaborative character of learning management. The former induces notifications of employees about novel learning opportunities, about their competency profile status, about their participation in learning courses, etc. Collaboration with learning providers requires a consistent exchange of information which is enabled by notification service capabilities.

Organizational indicators of participating organizational units and application systems shed light on further service design decisions. Overall high values hint towards further functional decomposition capacity. Participation of three and more application systems suggest (technical) service composition which may be prepared by an additional sub-process. Occurrences of two application systems participating in one process function, however, often indicate data exchange. In this case, the technical design may decide about the service roles, e.g., which system provides and which consumes the service. A group of human participants, however, indicates a high degree of collaboration that may not be resolved by predefined process logic. Instead, this process function may be marked as a very likely candidate for a human service.

Once process functions have been analyzed for their service eligibility, they may be categorized into data services, task services and human services. Table 1 below provides an overview of the identified functions, including their ranking and categories. That is, evaluation categories are provided in parentheses below. Data service capabilities are complemented by additional data manipulation functions missing in the process models so far. They may help facilitate future variations of learning management processes.

TABLE 1

Process Functions Eligible for Software Service Capabilities—Categorized and Evaluated

| Process Functions Eligible for Data Service Capabilities | Process Functions Eligible for Task Service Capabilities |
|---|---|
| Add competency objectives to competency plan (C) | Assign employee to roles (A) |
| | Automated competency profiling (B) |
| Annotate learning resource with competencies (B) | Carry out simulation (A) |
| | Create Balanced Scorecard (C) |
| Check if all competencies profiles are specified (C) | Create DuPont Model (C) |
| | Create HCM Scorecard (C) |
| Check if all employee competencies are assessed (D) | Determine competency gap (A) |
| | Inform learner about learning process (D) |
| Check if all learning resources are created (C) | Instantiate learning process (B) |
| Check if all required learning | Publish Performance Results and Goals (C) |

TABLE 1-continued

Process Functions Eligible for Software Service Capabilities—Categorized and Evaluated

| Process Functions Eligible for Data Service Capabilities | Process Functions Eligible for Task Service Capabilities |
|---|---|
| resources are available (D) | Request execution of learning units (B) |
| Check if competency objects are available for employees (B) | Search for learning design for competency gaps (C) |
| Check if employees are assigned to roles (B) | Search suitable learning design (C) |
| Create an empty evaluation report | Select as-is competencies for competency profiles (A) |
| Create an empty evaluation report (C) | Send invitations (B) |
| Create competency profile | |
| Create employee competency profiles (C) | |
| Create empty competency plan (B) | |
| Create new CA-CP (D) | |
| Provide business process model | |
| Provide learning design | |
| Provide learning resource | |
| Provide process performance data (B) | |
| Retrieve all course participants (C) | |
| Retrieve business process model | |
| Retrieve competency plan | |
| Retrieve learning design | |
| Retrieve learning resource | |
| Retrieve performance data | |
| Retrieve process performance data | |
| Store performance results (B) | |
| Transmit survey results (B) | |
| Update competency profile | |

Figure 6:
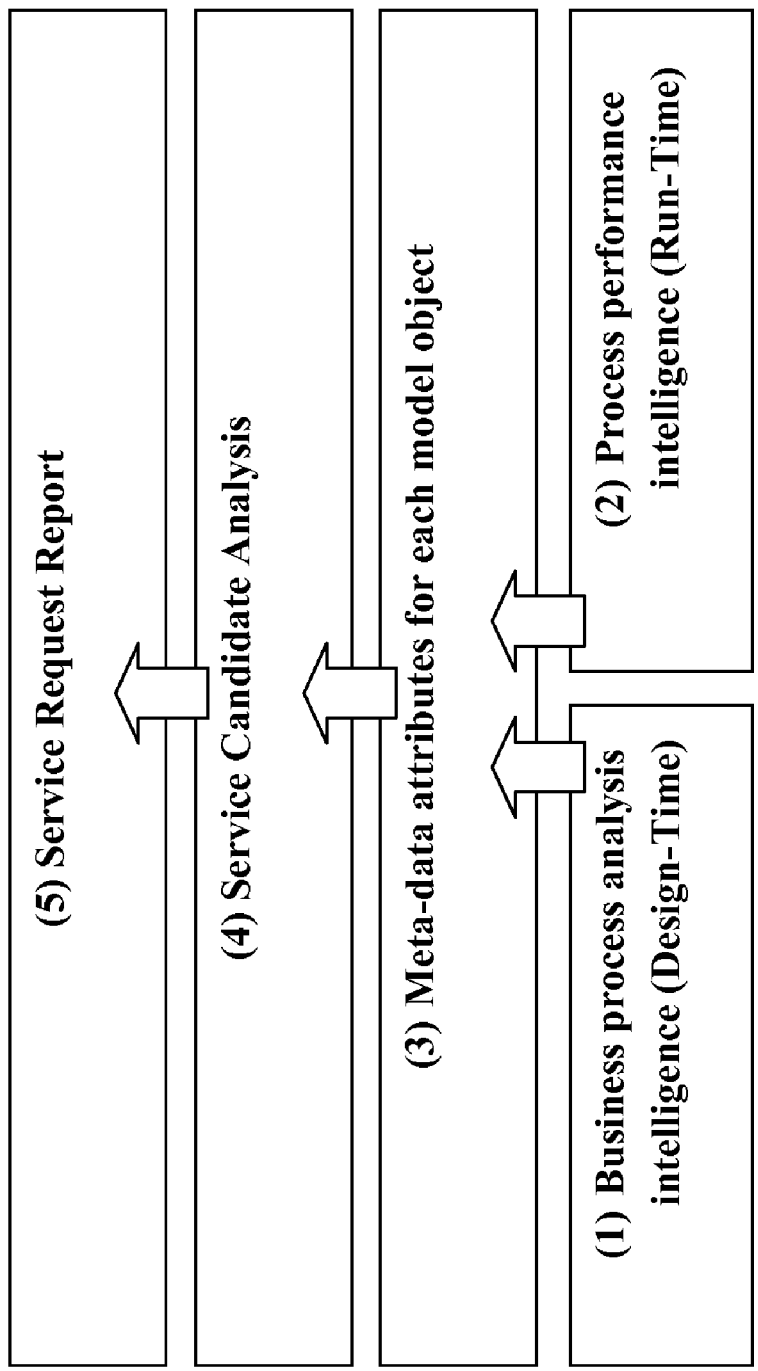
FIG. 6 is a high-level overview of the technical structure of certain example embodiments.

Certain example embodiments may be thought of as including the technical structure shown in FIG. 6. In other words, certain example embodiments operate in connection with a BPM system by first examining business process analysis intelligence (from design time) and process performance intelligence (from run-time). Metadata attributes for each model object are updated so as to include indicators corresponding to design time and/or run time gathered intelligence. Service candidate analysis is performed using the indicators stored with the metadata attributes. Service request reports can then be generated.

It is noted that a repository-based modeling tool (such as the ARIS platform) may be provided to allow for analyzing dependencies between modeling artifacts across process models in certain example embodiments. Similarly, process monitoring software systems that allow for process instance monitoring and performance management (e.g., ARIS PPM) may be provided in certain example embodiments.

As some variables are calculated based on the analysis of the overall model network, macros or reports may be scripted to provide desired design time data. For example, a script may feed the variable Occ( ) of a function with the number of occurrences of this function across all process models. Thus, business process analysis intelligence may be provided.

As some variables rely on run-time process data, an interface to a process monitoring tool (such as ARIS PPM) may be developed. It then may feed, for example, the number of invocations of a function i over the course of time t into the variable Invoc( ) of an EPC function. Thus, process performance analysis intelligence may be provided.

Figure 7:
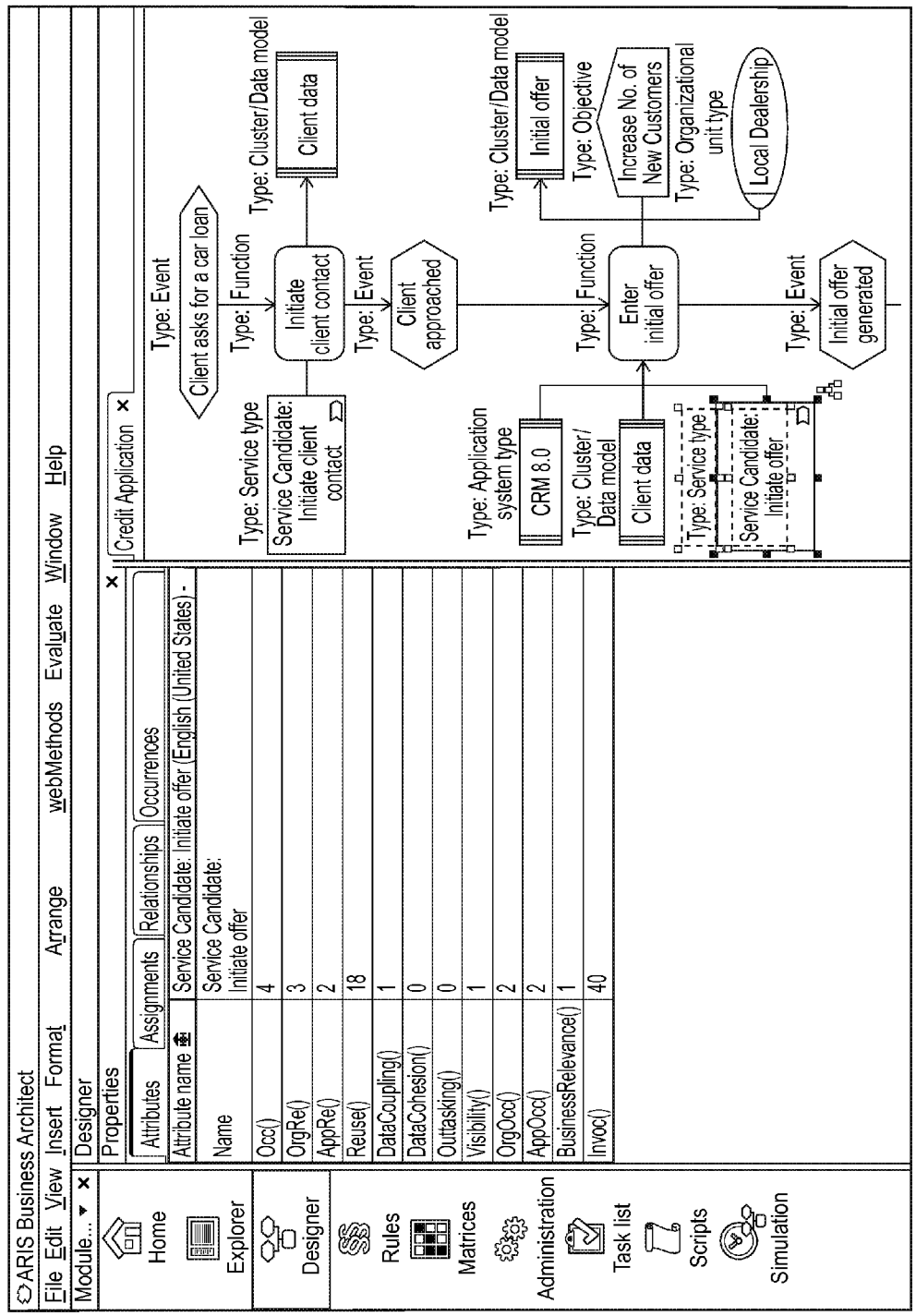
FIG. 7 is an example screenshot showing how gathered service indicators may be maintained in metadata attributes in accordance with certain example embodiments.

Variables involved in calculating service indicators (e.g., as described above) may be maintained in the metadata attribute set of each modeling artifact. Therefore, they may be maintained manually or automatically fed by intelligence tooling. In certain example embodiments, variables like outtasking( )

or visibility( ) may be maintained manually, while others may be retrieved from run-time data or the analysis of the model network. Thus, metadata attributes may be provided. For instance, FIG. 7 is an example screenshot showing how gathered service indicators may be maintained in metadata attributes in accordance with certain example embodiments. In FIG. 7, metadata attributes for an illustrative "initiate offer" service are maintained and include the example indicators identified above.

The overall eligibility algorithm may be implemented as a script that runs on a set of EPC functions and takes their variables as inputs. It may calculate individual service eligibility values of each function and ranks them accordingly. This calculation may be done on the basis of the overall service eligibility formula with weighted values. The weights may depend on, for example, the objectives to be reached with the resulting service-oriented business process systems. Depending on the overall service eligibility value, a process function may qualify as a sustainable service candidate and accordingly may be forwarded to service development in the next step.

Figure 8:
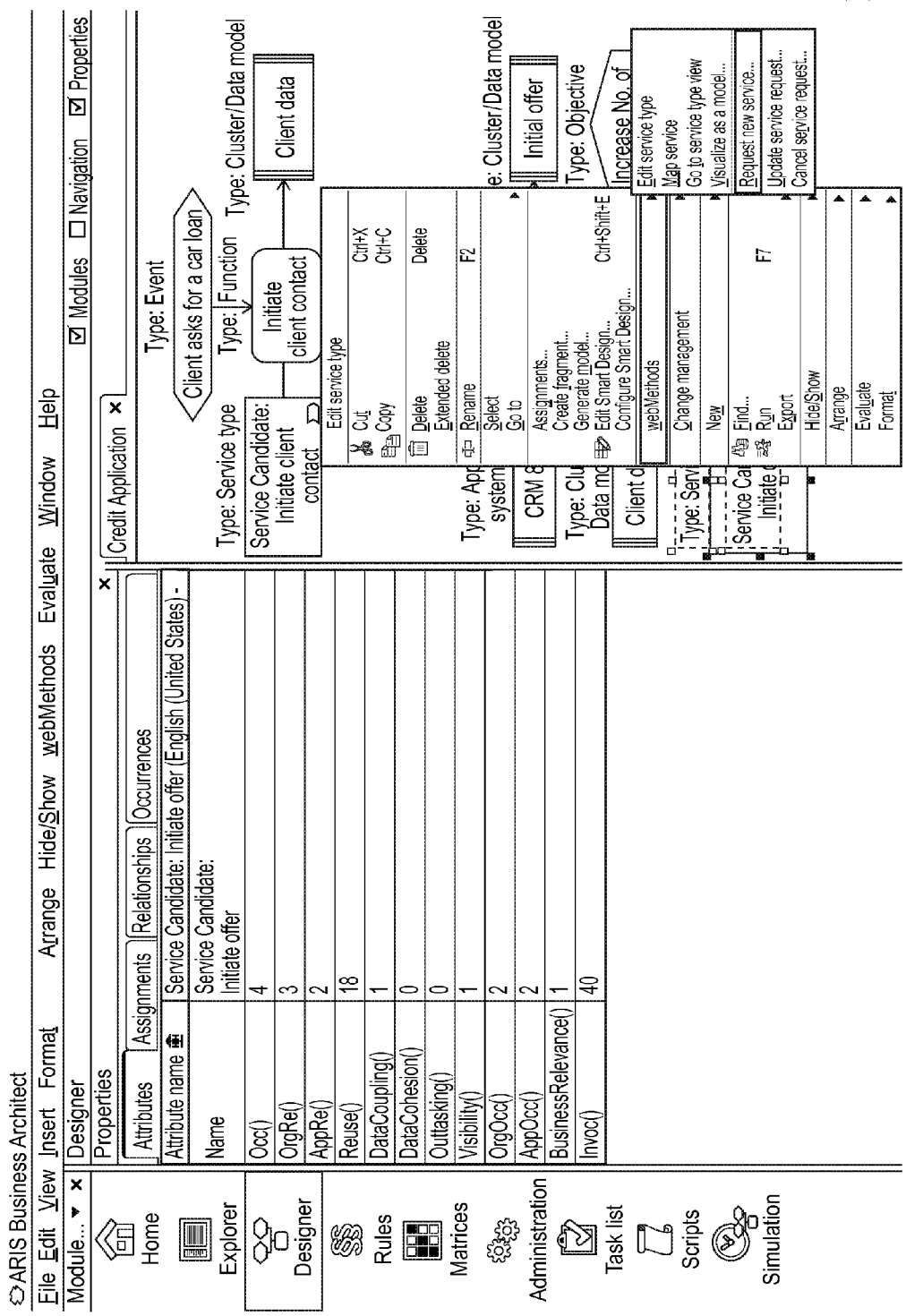
FIG. 8 is an example screenshot demonstrating how a new service request may be initiated in accordance with certain example embodiments.

To request the development of the top level service candidates, a report may gather all information modeled in the context of the corresponding EPC function and provide them as a requirements specification document. For instance, FIG. 8 is an example screenshot demonstrating how a new service request may be initiated in accordance with certain example embodiments.

Figure 9:
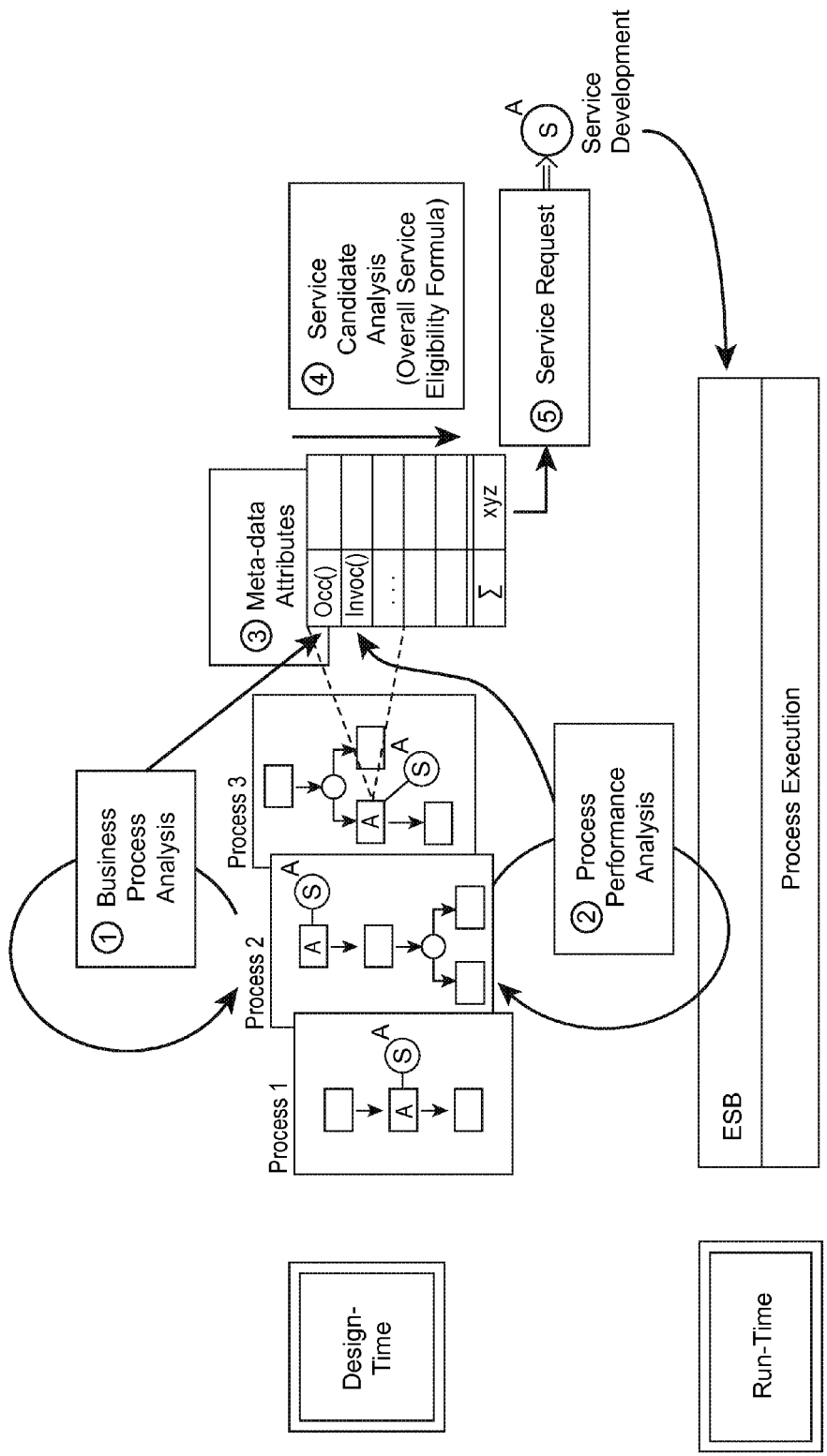
FIG. 9 is a more detailed diagram illustrating the technical approach of certain example embodiments at both design time and at run time.

FIG. 9 is a more detailed diagram illustrating the technical approach of certain example embodiments at both design time and at run time. As shown in FIG. 9, a process executes on an Enterprise Service Bus (ESB) at run time. However, at design time, a business process is defined. The FIG. 9 example includes three processes, which each include various functions and services. Business process analysis may be performed on the defined processes, e.g., at design time. Similarly, business performance analysis may be performed on the defined processes, e.g., at run time. Indicators may be gathered to generate an STEM, which may be stored together with metadata attributes of a selected function, service, or other structure from within one or more of the defined processes. A formula may be applied to the indicators to create a total service eligibility figure, e.g., as a part of service candidate analysis. This calculation may help to respond to service requests, e.g., by finding a matching candidate service, which may then be implemented or executed by the process on the ESN at run time.

It will be appreciated that as used herein, the terms system, subsystem, service, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible computer readable storage medium. It also will be appreciated that the techniques described herein may be accomplished by having a processor execute instructions that may be tangibly stored on a computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of analyzing functions of a business process model for possible exposure as service capabilities in a service-oriented business process system, the method comprising:
    receiving a business process model defined by a plurality of objects, each said object having metadata attributes associated therewith;
    obtaining business process analysis intelligence at design time for each said object;
    obtaining process performance intelligence at run time for each said object;
    storing indicators corresponding to the design time and run time gathered intelligence together with the metadata attributes for the corresponding object;
    applying, via at least one processor of the service-oriented business process system, an overall service candidate algorithm to the stored indicators to arrive at a total service eligibility value for each process function in the model; and
    exposing a function as a service capability if the total service eligibility value for the function exceeds a predetermined threshold value,
    wherein the overall service candidate algorithm comprises, for each said function:
        obtaining a first value by adding together the expected reusability of the function over a predefined time period, the data cohesion of the function, out-tasking and visibility variables respectively indicating the extent to which execution of the function can be out-tasked to stakeholders and can be made visible to stakeholders,
        obtaining a second value by subtracting from the first value a degree of data coupling for the function, a maximum number of organizational units involved in the function, and a maximum number of application systems involved in the function, and
        multiplying the second value by a business relevance indicator for the function to obtain the total service eligibility value for the function.

2. The method of claim 1, further comprising responding to a request for a service candidate by recommending at least one process function having a sufficiently high total service eligibility value.

3. The method of claim 1, wherein the indicators include process indicators, data indicators, organizational indicators, and goal and event indicators.

4. The method of claim 3, wherein each total service eligibility value is a weighted combination of the associated indicators.

5. The method of claim 4, wherein the weights correspond to one or more objectives to be reached with the resulting service-oriented business process system.

6. The method of claim 1, wherein the indicators include at least one reusability indicator for functions in the model, at least one data coupling indicator for functions in the model, at least one data cohesion indicator for functions in the model, at least one stakeholder integration indicator for functions in the model, at least one organizational involvement indicator for functions in the model, at least one goal-oriented indicator for service eligibility, and/or at least one event-oriented indicator for service relevance.

7. The method of claim 6, wherein the total service eligibility value is a weighted combination of the indicators.

8. The method of claim 7, wherein the weights correspond to one or more objectives to be reached with the resulting service-oriented business process system.

9. The method of claim 1, further comprising:
gathering the design time intelligence via scripted macros or reports; and
gathering the run time intelligence via an interface to a process monitoring tool.

10. The method of claim 1, further comprising ranking the total service eligibility values for the process functions.

11. The method of claim 10, further comprising organizing the ranked total service eligibility values into groups based on the rankings.

12. The method of claim 11, wherein the groups are formed so as to approximate a normal distribution.

13. The method of claim 11, further comprising displaying the groups to a user of the service-oriented business process system.

14. A method of defining or refining a business process model, the method comprising:
graphically displaying, on a display of a computer system, a representation of at least a portion of the business process model, the portion including a plurality of objects;
enabling a user to select an object of the model via a user interface;
in response to a user request received via the user interface, graphically displaying, on the display of the computer system, metadata attributes of the selected object, wherein indicators corresponding to gathered business process analysis intelligence and/or gathered process performance intelligence are displayed together with the metadata attributes in a matrix format; and
calculating, via at least one processor, a total service eligibility value for each process function in the model based on a weighted summation of the indicators,
wherein the indicators corresponding to the business process analysis intelligence are gathered at design time via scripted macros or reports and the indicators corresponding to the process performance intelligence are gathered at run time via an interface to a process monitoring tool,
wherein the overall service candidate algorithm comprises, for each said function:
obtaining a first value by adding together the expected reusability of the function over a predefined time period, the data cohesion of the function, out-tasking and visibility variables respectively indicating the extent to which execution of the function can be out-tasked to stakeholders and can be made visible to stakeholders,
obtaining a second value by subtracting from the first value a degree of data coupling for the function, a maximum number of organizational units involved in the function, and a maximum number of application systems involved in the function, and
multiplying the second value by a business relevance indicator for the function to obtain the total service eligibility value for the function, and
wherein a function is exposable as a service capability if the total service eligibility value for the function exceeds a predetermined threshold value.

15. The method of claim 14, further comprising:
receiving a request for a service from the user; and
displaying at least one service candidate as a result of the request.

16. The method of claim 15, wherein a plurality of service candidates are displayed.

17. The method of claim 16, wherein the service candidates are ordered based on their respective total service eligibility values.

18. The method of claim 15, wherein each said service candidate is displayed only if it exceeds a predetermined threshold value.

19. The method of claim 15, wherein exactly one service candidate is displayed, the service candidate corresponding to the function having the highest total service eligibility value.

20. A non-transitory computer readable storage medium including instructions that, when executed by a processor of a computer system, provide for analyzing functions of a business process model for possible exposure as service capabilities in a service-oriented business process system, by at least:
receiving a business process model defined by a plurality of objects, each said object having metadata attributes associated therewith;
obtaining business process analysis intelligence at design time for each said object;
obtaining process performance intelligence at run time for each said object;
storing indicators corresponding to the design time and run time gathered intelligence together with the metadata attributes for the corresponding object;
applying an overall service candidate algorithm to the stored indicators to arrive at a total service eligibility value for each process function in the model; and
exposing a function as a service capability if the total service eligibility value for the function exceeds a predetermined threshold value,
wherein the overall service candidate algorithm comprises, for each said function:
obtaining a first value by adding together the expected reusability of the function over a predefined time period, the data cohesion of the function, out-tasking and visibility variables respectively indicating the extent to which execution of the function can be out-tasked to stakeholders and can be made visible to stakeholders,
obtaining a second value by subtracting from the first value a degree of data coupling for the function, a maximum number of organizational units involved in the function, and a maximum number of application systems involved in the function, and
multiplying the second value by a business relevance indicator for the function to obtain the total service eligibility value for the function.

21. A non-transitory computer readable storage medium including instructions that, when executed by a processor of a computer system, provide for defining or refining a business process model, by at least:
graphically displaying, on a display of the computer system, a representation of at least a portion of the business process model, the portion including a plurality of objects;
enabling a user to select an object of the model via a user interface;
in response to a user request received via the user interface, graphically displaying, on the display of the computer system, metadata attributes of the selected object, wherein indicators corresponding to gathered business process analysis intelligence and/or gathered process performance intelligence are displayed together with the metadata attributes in a matrix format; and calculating, via at least one processor, a total service eligibility value for each process function in the model based on a weighted summation of the indicators, wherein the indicators corresponding to the business process analysis intelligence are gathered at design time via scripted macros or reports and the indicators corresponding to the process performance intelligence are gathered at run time via an interface to a process monitoring tool, wherein the overall service candidate algorithm comprises, for each said function:

obtaining a first value by adding together the expected reusability of the function over a predefined time period, the data cohesion of the function, out-tasking and visibility variables respectively indicating the extent to which execution of the function can be out-tasked to stakeholders and can be made visible to stakeholders, obtaining a second value by subtracting from the first value a degree of data coupling for the function, a maximum number of organizational units involved in the function, and a maximum number of application systems involved in the function, and multiplying the second value by a business relevance indicator for the function to obtain the total service eligibility value for the function, and wherein a function is exposable as a service capability if the total service eligibility value for the function exceeds a predetermined threshold value.

22. A service-oriented business process system for analyzing functions of a business process model for possible exposure as service capabilities, comprising:

a non-transitory computer readable storage medium including a representation of the business process model, the business process model being defined by a plurality of objects, each said object having metadata attributes associated therewith, the metadata attributes also being stored in the computer readable storage medium;

a first computer-executable intelligence gathering module configured to obtain business process analysis intelligence at design time for each said object;

a second computer-executable intelligence gathering module configured to obtain process performance intelligence at run time for each said object;

a computer-executable analysis module configured to (a) receive indicators corresponding to the design time and run time gathered intelligence, and (b) apply a service candidate algorithm on some or all of the indicators to arrive at a total service eligibility value for each process function in the model, wherein the modules are executable via at least one processor of the system, wherein the overall service candidate algorithm comprises, for each said function:

obtaining a first value by adding together the expected reusability of the function over a predefined time period, the data cohesion of the function, out-tasking and visibility variables respectively indicating the extent to which execution of the function can be out-tasked to stakeholders and can be made visible to stakeholders, obtaining a second value by subtracting from the first value a degree of data coupling for the function, a maximum number of organizational units involved in the function, and a maximum number of application systems involved in the function, and multiplying the second value by a business relevance indicator for the function to obtain the total service eligibility value for the function, and wherein the at least one processor is configured to expose a function as a service capability if the total service eligibility value for the function exceeds a predetermined threshold value.

23. The system of claim 22, further comprising a report generator configured to recommend at least one service candidate in response to request for a function, the recommendation being based on total service eligibility values associated with the functions.

24. The system of claim 23, wherein the indicators include process indicators, data indicators, organizational indicators, and goal and event indicators.

25. The system of claim 24, wherein the total service eligibility value is a weighted combination of the indicators.

26. The system of claim 25, wherein the weights correspond to one or more user-specified objectives to be reached with the resulting service-oriented business process system.

* * * * *